United States Patent [19]
Giacomelli et al.

[11] Patent Number: 5,890,347
[45] Date of Patent: Apr. 6, 1999

[54] METHOD AND APPARATUS FOR SEALING A GABLED CONTAINER

[75] Inventors: Peter Giacomelli, Lund, Sweden; Ken Eno, Burnsville, Minn.; Kenneth Pokusa, Willowbrook, Ill.

[73] Assignee: Tetra Laval Holdings & Finance SA, Pully, Switzerland

[21] Appl. No.: 944,701

[22] Filed: Oct. 6, 1997

[51] Int. Cl.$^6$ .................................................. B65B 51/10
[52] U.S. Cl. .......................... 53/477; 53/DIG. 2; 53/565; 156/580.1; 156/580.2
[58] Field of Search ................................ 53/477, DIG. 2, 53/476, 565, 374.2, 371.2, 559; 156/580.1, 580.2

[56] References Cited

U.S. PATENT DOCUMENTS

| | | |
|---|---|---|
| 2,056,330 | 10/1936 | Scott . |
| 2,410,587 | 11/1946 | Monroe . |
| 3,200,557 | 8/1965 | Schwenk . |
| 3,294,616 | 12/1966 | Linsley et al. . |
| 3,468,731 | 9/1969 | Obeda . |
| 3,586,589 | 6/1971 | Jugler . |
| 3,612,385 | 10/1971 | Humpage . |
| 3,649,421 | 3/1972 | Berleyoung . |
| 3,661,661 | 5/1972 | Berleyoung . |
| 3,863,826 | 2/1975 | Shoh . |
| 3,947,307 | 3/1976 | Buchscheidt . |
| 3,996,724 | 12/1976 | Smith . |
| 4,145,236 | 3/1979 | Neumayer et al. . |
| 4,241,560 | 12/1980 | Deimel et al. . |
| 4,251,303 | 2/1981 | Deimel et al. . |
| 4,357,186 | 11/1982 | Calvert . |
| 4,401,501 | 8/1983 | Stumpf . |
| 4,403,465 | 9/1983 | Bachner . |
| 4,444,614 | 4/1984 | Krayer . |
| 4,518,377 | 5/1985 | Skinner . |
| 4,581,873 | 4/1986 | Knuppertz et al. . |
| 4,647,325 | 3/1987 | Bach . |
| 4,738,077 | 4/1988 | Wakbayashi et al. . |
| 4,803,827 | 2/1989 | Posey et al. . |
| 4,860,902 | 8/1989 | Kieser . |
| 4,951,444 | 8/1990 | Epstein et al. ............................ 53/559 |
| 5,083,702 | 1/1992 | Wyberg . |
| 5,085,029 | 2/1992 | Esper . |
| 5,214,905 | 6/1993 | Wyberg . |
| 5,255,494 | 10/1993 | Doyle . |
| 5,285,955 | 2/1994 | Mosse . |
| 5,321,930 | 6/1994 | Poole . |
| 5,518,578 | 5/1996 | Persells et al. . |
| 5,564,255 | 10/1996 | Giacomelli ............................ 53/371.2 |
| 5,575,884 | 11/1996 | Annehed et al. . |
| 5,605,026 | 2/1997 | Schott et al. . |
| 5,713,181 | 2/1998 | Giacomelli . |

*Primary Examiner*—James F. Coan
*Assistant Examiner*—Gene L. Kim
*Attorney, Agent, or Firm*—Michael A. Catania

[57] ABSTRACT

A method of forming a container including the steps of: providing a sheet material defining a peripheral wall structure bounding a receptacle with an open end, and a closure portion having gable panels and a plurality of fins for closing the open end of the receptacle; reconfiguring the closure portion to place the closure portion in a closed state wherein the plurality of fins are in overlying relationship and the gable panels reside between the fins and the peripheral wall structure; effecting a seal between a plurality of the fins using a first sealing pattern; and after effecting the seal using the first sealing pattern effecting a seal between a plurality of the fins using a second sealing pattern.

4 Claims, 6 Drawing Sheets

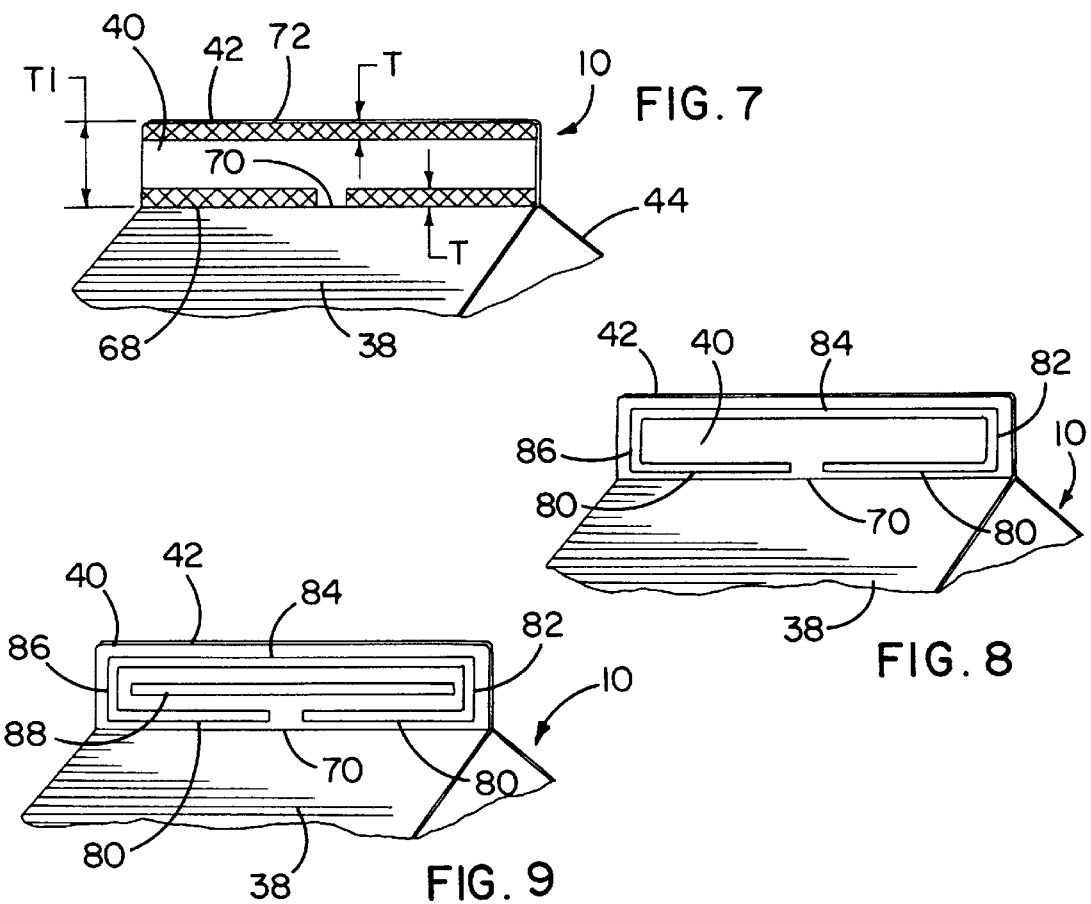
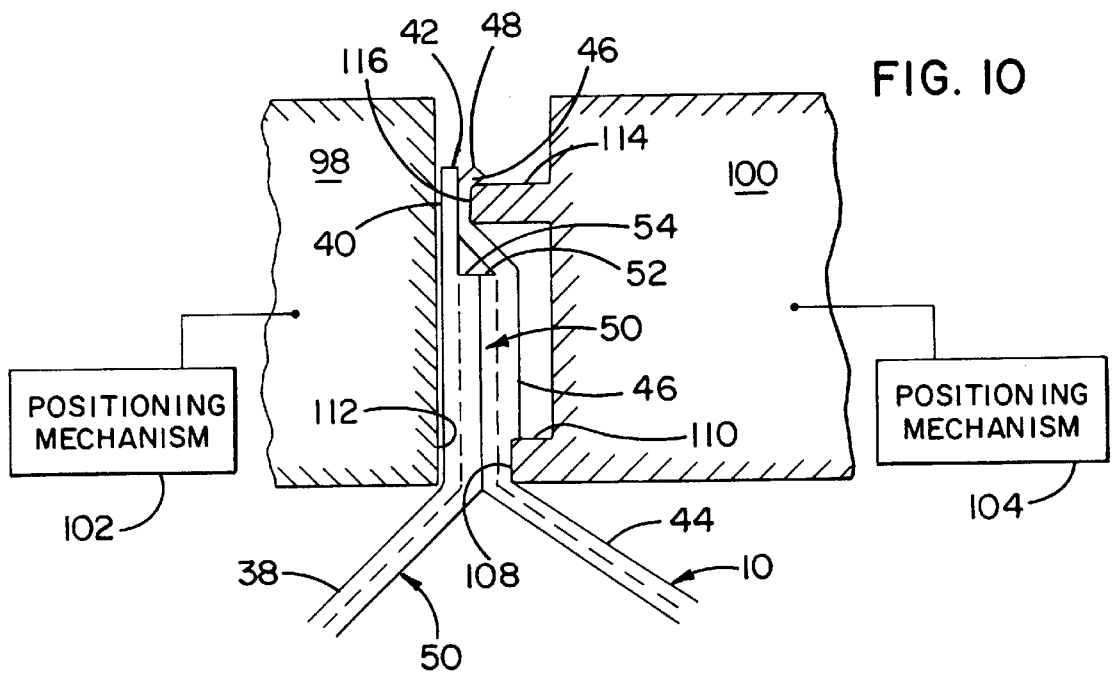

METHOD AND APPARATUS FOR SEALING A GABLED CONTAINER

BACKGROUND OF THE INVENTION

1. Field of the Invention

This invention relates to containers and, more particularly, to a container having a gabled closure portion.

2. Background Art

Gabled containers made from paperboard material abound in many different environments. These containers are used commonly for both edible and non-edible products.

Typically, this type of container is erected from a preformed paperboard blank which is coated on both sides with polyethylene, or other known heat-sealable material. The blank has pre-formed fold lines which allow sequential folding of parts of the blank in a predetermined fashion to erect the container. In one preliminary folding stage, the container assumes a cup shape with an open end. A closure portion, which is made up of gable panels and a plurality of fins, is then reconfigured so that the panels converge upwardly to the fins which are brought into mutually overlying relationship.

The closure portion of the container can be sealed using a number of different techniques, among which is an ultrasonic sealing technique. Ultrasonic sealing is carried out by sandwiching the fins between a sealing horn/sonotrode and anvil. Vibrational energy generated through the horn/sonotrode causes a fusion between the heat-sealable material on abutting fin surfaces. Exemplary ultrasonic sealing apparatus and methods are described in each of U.S. Pat. Nos. 5,564,255; 5,575,884; and 5,605,026, all of which have been assigned to Tetra Laval Holdings and Finance S.A.

For product that is required to be maintained in an aseptic environment, hermetic sealing between the fins is required. Conventional hot air sealing techniques may not be capable of effecting the required quality of hermetic seal for these products. Thus, ultrasonic sealing is conventionally used in most such operations. While conventional ultrasonic sealing techniques may be practiced to produce a high integrity hermetic seal, conventional ultrasonic sealing techniques introduce a time factor that must be contended with.

More particularly, the heat-sealable material must be cooled after fusion sufficiently that it will stably maintain the seal. The seal is put under stress by the restoring force in the gable panels and fins after the captive force between the sealing horn/sonotrode and anvil is eliminated. This problem can be minimized by allowing additional cooling time. However, doing so may not be compatible with the intended operating speeds of modern filling equipment. As an example, a line which is designed to operate at 14,000 packages per hour, allows only approximately 580 ms for each sealing step. The objectives of making a high integrity hermetic seal and producing the seal quickly on a filling line thus come into competition. By effecting the seal over substantially the entirety of the exposed fin surfaces, a more aggressive holding force can be established between the fins. However, the larger the area that is sealed, the greater is the heat retention within the seal and the longer becomes the cooling time for the seal to be stabilized.

SUMMARY OF THE INVENTION

The invention is directed to a method of forming a container including the steps of: providing a sheet material defining a peripheral wall structure bounding a receptacle with an open end, and a closure portion having gable panels and a plurality of fins for closing the open end of the receptacle; reconfiguring the closure portion to place the closure portion in a closed state wherein the plurality of fins are in overlying relationship and the gable panels reside between the fins and the peripheral wall structure; effecting a seal between a plurality of the fins using a first sealing pattern; and after effecting the seal using the first sealing pattern effecting a seal between a plurality of the fins using a second sealing pattern.

The step of effecting a seal using the first sealing pattern may be carried out at a first station. The container may be repositioned to a second station at which the step of effecting a seal using the second sealing pattern is carried out.

The step of effecting a seal using the second sealing pattern may involve effecting a hermetic seal using an ultrasonic sealing technique.

The step of sealing using the first sealing pattern may involve the step of effecting a seal over a first predetermined area on the container with the step of effecting a seal using the second sealing pattern involving the step of effecting a seal over a second predetermined area which does not overlap with the first predetermined area.

The step of effecting a seal using the first sealing pattern may involve the step of effecting a seal over a first predetermined area so that one portion of the first predetermined area resides adjacent to the gable panels, with the step of effecting a seal using the second sealing pattern involving the step of effecting a seal over a second predetermined area so that a portion of the second predetermined area is spaced further from the gable panels than the one portion of the first predetermined area.

The step of effecting a seal using the first sealing pattern may involve the step of effecting a seal over a first predetermined area so that one portion of the first predetermined area resides adjacent to the gable panels and a second portion of the first predetermined area is spaced from the gable panels further than the one portion of the first predetermined area. The step of effecting a seal using the second sealing pattern may involve the step of effecting a seal over a second predetermined area so that a portion of the second predetermined area resides between, and is fully spaced from at least one of, the one and second portions of the first predetermined area.

The step of effecting a seal using the first sealing pattern may involve the step of effecting a seal over a first predetermined area including a first substantially straight line portion and a second substantially straight line portion spaced from and substantially parallel to the first line portion. The step of effecting a seal using the second sealing pattern may involve the step of effecting a seal over a second predetermined area including a substantially straight line portion between and substantially parallel to each of the first and second line portions.

The step of effecting a seal using the first sealing pattern may involve the step of effecting a seal over the first predetermined area so that a third portion of the first predetermined area connects between the first and second line portions.

The step of effecting a seal using the first sealing pattern may involve the step of effecting a non-hermetic seal, with the step of effecting a seal using the second sealing pattern involving the step of effecting a hermetic seal.

The step of effecting a seal using the first sealing pattern may involve the step of effecting a seal using an ultrasonic sealing technique at a first temperature and first energy level, with the step of effecting a seal using the second sealing pattern involving the step of effecting a seal using an ultrasonic sealing technique at a second temperature and second energy level with at least one of a) the first temperature being different than the second temperature and b) the first energy level being different than the second energy level.

The invention also contemplates a method of forming a container including the steps of: providing a sheet material defining a peripheral wall structure bounding a receptacle with an open end and a closure portion having gable panels and a plurality of fins for closing the open end of the receptacle; reconfiguring the closure portion to place the closure portion in a closed state wherein the plurality of fins are in overlying relationship and the gable panels reside between the fins and the peripheral wall structure; and effecting a seal between a plurality of the fins using a sealing pattern over a predetermined area that has at least three line portions.

In one form, at least one of the fins is joined to one of the gable fins along a first fold line and the step of effecting a seal involves the step of effecting a seal so that a first and second of the line portions are substantially parallel to each other and the first fold line.

The step of effecting a seal may involve the step of effecting a seal over at least part of the predetermined area using an ultrasonic sealing technique.

The step of effecting a seal may involve the step of effecting a seal using a sealing pattern having a plurality of line portions that are fully spaced, each from the other.

In one form, at least one of the fins has a free end and is joined to one of the gable panels along a first fold line, with there being a first dimension between the first fold line and the free end of the one fin and the step of effecting a seal involves the step of effecting a seal so that one of the line portions has a thickness that is not greater than one-fourth of the first dimension.

The invention further contemplates a container having a sheet material defining a) a peripheral wall structure bounding a receptacle with an open end and b) a closure portion having gable panels and a plurality of fins for closing the open end of the receptacle. A seal is provided between a plurality of the fins over a predetermined area on the container. The seal is effected by forming one part of the seal over one portion of the predetermined area using a first sealing pattern and forming a second part of the seal over a second portion of the predetermined area using a second sealing pattern, with the one and second parts of the seal being non-simultaneously completed.

In one form, the one part of the seal is non-hermetic and completed before the second part of the seal. The second part of the seal may be a hermetic seal.

In one form, the one part of the seal has first and second portions and the second part of the seal resides at least partially between the first and second portions of the one part of the seal.

In one form, at least one of the fins has a free end and is connected to one of the gable panels along a first fold line and at least a portion of one of the one and second parts of the seal extends in substantially a straight line that is substantially parallel to the first fold line.

At least one of the one and second parts of the seal may be formed using an ultrasonic sealing technique.

The invention also contemplates a container having a sheet material defining a) a peripheral wall structure bounding a receptacle with an open end, and b) a closure portion having gable panels and a plurality of fins for closing the open end of the receptacle. The seal is effected a) by forming one part of the seal over one portion of the predetermined area using an ultrasonic sealing technique at a first temperature and at first energy level, and b) by forming a second part of the seal over a second portion of the predetermined area using an ultrasonic sealing technique at a second temperature and at a second energy level. At least one of i) the first temperature is different than the second temperature and ii) the first energy level is different than the second energy level.

The invention also contemplates a method of forming a container including the steps of: providing a sheet material defining a peripheral wall structure bounding a receptacle with an open end and a closure portion having gable panels and a plurality of fins with free ends for closing the open end of the receptacle; reconfiguring the closure portion to a closed state wherein the plurality of fins are in overlying relationship and a first and second of the fins are abutted adjacent to the free ends of the first and second fins; providing first and second holding surfaces; moving at least one of the first and second holding surfaces relative to the other of the first and second holding surfaces and the closure portion to captively hold the first and second fins against each other with a compressive force that is sufficiently close to the free ends of the first and second fins so that there is no spacing between the free ends of the first and second fins; and effecting a seal between the first and second fins with the first and second fins captively held against each other by the first and second holding surfaces.

The step of moving at least one of the first and second holding surfaces may involve the step of moving at least one of the first and second holding surfaces relative to the other of the first and second holding surfaces and the closure portion so that the first and second holding surfaces extend fully up to the free ends of the first and second fins with the first and second holding surfaces captively holding the first and second fins against each other.

The step of moving at least one of the first and second holding surfaces may involve the step of moving at least one of the first and second holding surfaces relative to the other of the first and second holding surfaces and the closure portion so that the first and second holding surfaces extend fully up to and beyond the free ends of the first and second fins with the first and second holding surfaces captively holding the first and second fins against each other.

The step of providing first and second holding surfaces may involve the step of providing first and second holding surfaces having a non-uniform spacing, with the first and second holding surfaces captively holding the first and second fins against each other.

The step of providing first and second holding surfaces may involve the step of providing the first surface with an arcuate portion.

The step of moving at least one of the first and second holding surfaces may involve the step of moving at least one of the first and second holding surfaces relative to the other of the first and second holding surfaces and the closure portion so that the arcuate portion of the first surface is spaced progressively further from the second surface in a direction away from the free ends of the first and second fins.

The step of effecting a seal between the first and second fins may involve the steps of effecting a seal between the first and second fins using a first sealing pattern, after effecting the seal using the first sealing pattern effecting a seal between a plurality of the fins using a second sealing pattern, and using the first and second sealing patterns to ultrasonically effect a part of the seal.

The invention also contemplates a sealing assembly for a container, which sealing assembly has a first member with a substantially flat first sealing surface with an area; and a second member having an elongate projection thereon with a free end having a second sealing surface with an area. The first and second members are movable relative to each other to an operative position for producing a captive force on a container therebetween. The first and second surfaces face each other with the first and second members in the operative position. There is a non-uniform spacing between the first and second surfaces over the areas of the first and second surfaces.

Each of the first and second members may be movable relative to a reference plane such that with the first and second members in the operative position the first sealing surface is substantially parallel to the reference plane. The second surface may have a flat portion that makes an angle with respect to the reference plane. The angle may be on the order of 5°.

In one form, the flat portion of the second surface extends over substantially the entire area of the second surface. The flat portion of the second surface may extend over substantially the entire length of the elongate projection.

The second member may have a second elongate projection thereon with a free end having a third sealing surface.

The invention also contemplates the sealing assembly in combination with a container having first and second angled gable panels and a plurality of fins projecting upwardly from the gable panels in an overlapping relationship. A first one of the fins has an exposed surface area facing in a first direction and a second one of the fins has an exposed surface area facing oppositely to the first direction. The fins reside between the first and second surfaces with the first and second members in the operative position and the container in a sealing position.

BRIEF DESCRIPTION OF THE DRAWINGS

FIG. 7 is a view as in FIG. 6 and showing one sealing pattern on the sealing arrangement of FIG. 6;

FIG. 8 is a view as in FIGS. 6 and 7 and showing a modified form of sealing pattern, according to the present invention;

FIG. 9 is a view as in FIG. 8 and with another sealing pattern used in conjunction with the sealing pattern of FIG. 7;

FIG. 10 is a fragmentary, cross-sectional view of a closure portion of a container and showing cooperating ultrasonic sealing members, according to the present invention, effecting a seal between a plurality of fins;

DETAILED DESCRIPTION OF THE DRAWINGS

Figure 1:
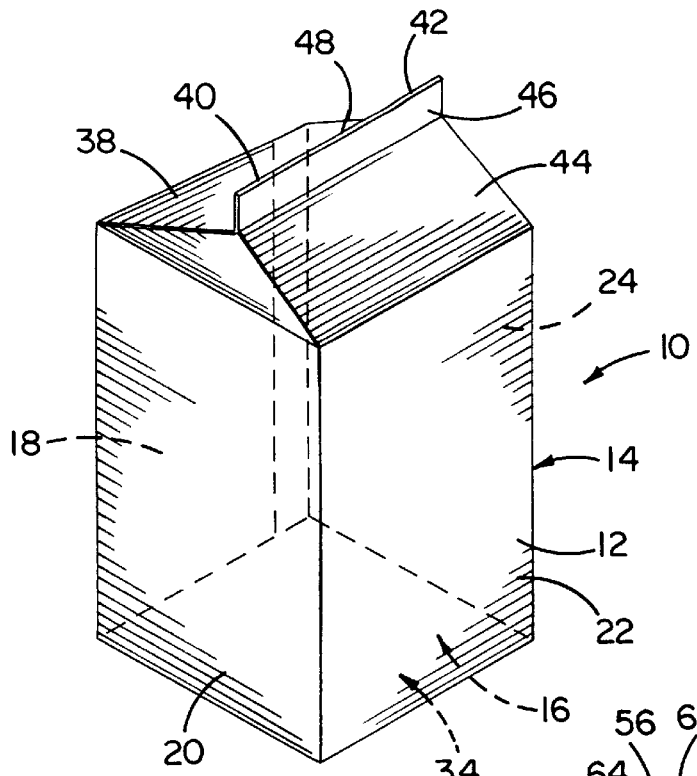
FIG. 1 is a perspective view of a completed container made according to the present invention.

Referring initially to FIGS. 1–4, a container is shown at 10, as one exemplary environment for the present invention. The container 10 is formed from a paperboard blank 12 which is coated on one or both sides with a thermoplastic material, such as polyethylene, or other known heat-sealable material. The blank 12 can be die cut from stock material and has preformed fold lines throughout to facilitate consistent erection of the container to the completed state in FIG. 1.

The container 10 has a peripheral wall structure 14 which bounds a receptacle 16 for product to be stored. The peripheral wall structure 14 is defined in this embodiment by four contiguous wall panels 18, 20, 22, 24 which extend to wall panels 26, 28, 30, 32, which are reconfigurable in a conventional fashion to cooperatively define a wall 34 which closes the bottom of the container 10.

The wall 18 extends upwardly to form a gable panel 38 which terminates at a fin 40 having a free end 42. The wall panel 22 similarly extends upwardly to a gable panel 44 and a fin 46 having a free end 48. The wall panel 20 extends upwardly to a flap 50 having a fin 52 with a free end 54. The wall 24 has a similar flap 56 with a fin 58 having a free end 60. The gable panels 38, 44, flaps 50, 56, and fins 40, 46, 52, 58 cooperatively define a closure portion for the open upper end of the receptacle 16.

Figure 2:
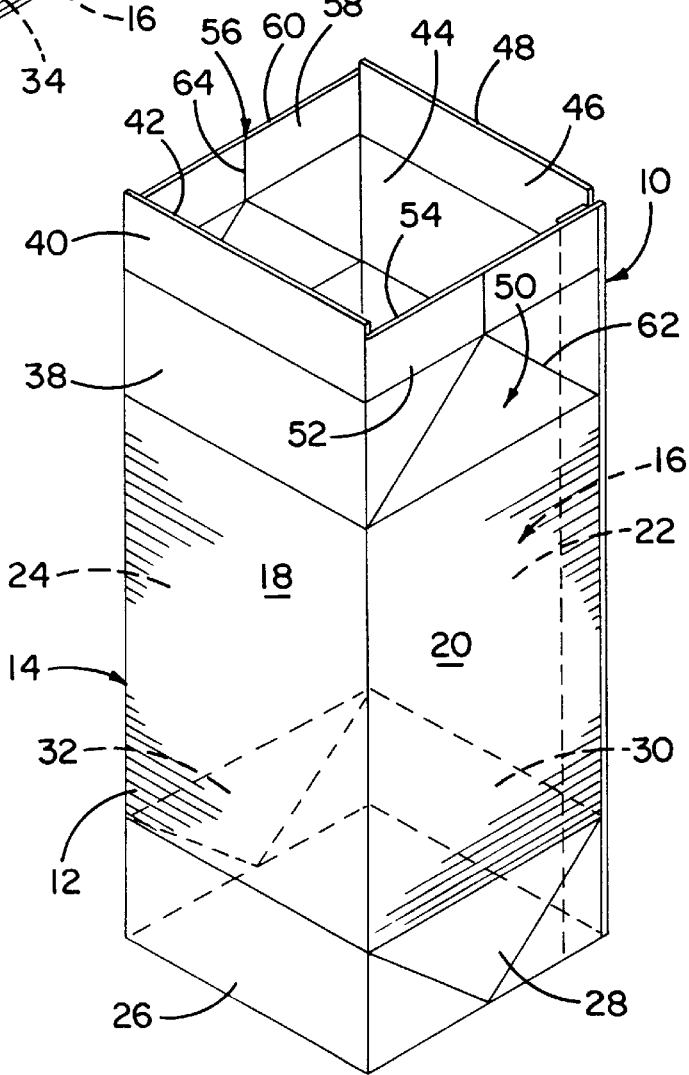
FIG. 2 is a perspective view of a partially erected blank used to form the container of FIG. 1.
Figure 3:
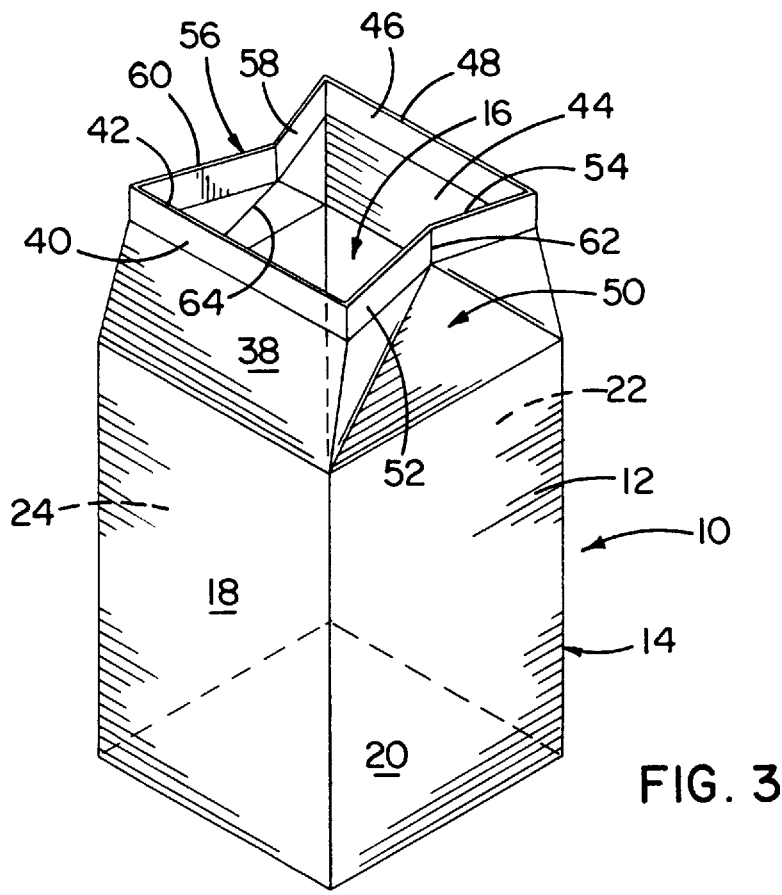
FIG. 3 is a perspective view of the blank as in FIG. 2 with gable panels and fins thereon being folded towards the completed state in FIG. 1.
Figure 4:
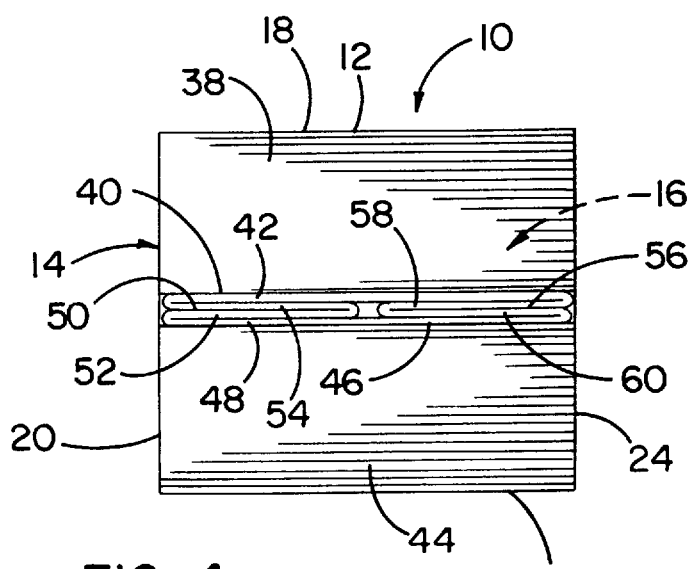
FIG. 4 is a plan view of the completed container of FIGS. 1–3.

An inverted, Y-shaped fold line 62 bisects the fin 52 and allows the flap 50 to collapse inwardly as shown in FIG. 3. A similar fold line 64 in the flap 56 allows the flap 56 to collapse inwardly towards the flap 50 as shown also in FIG. 3. With the fins 52, 58 each folded against themselves about the fold lines 62, 64, the fins 40, 46, 52, 58 assume a mutually overlying relationship as shown in FIG. 4. This represents the closed state for the closure portion. As shown in FIGS. 2, the fins 40, 46 may each extend upwardly a slight distance beyond the fin free ends 54, 60 so that in the closed state the fins 40, 46 are directly abuttable to each other adjacent to the free ends 42, 48 thereof. This arrangement is not, however, required.

The present invention is concerned with effecting a seal between the fins 40, 46, 52, 58. In one form, the seal is effected using an ultrasonic sealing technique, such as that shown in each of Tetra Laval Holdings & Finance S.A.'s U.S. Pat. Nos. 5,564,255; 5,575,884; and 5,605,026, which are incorporated herein by reference.

Figure 6:
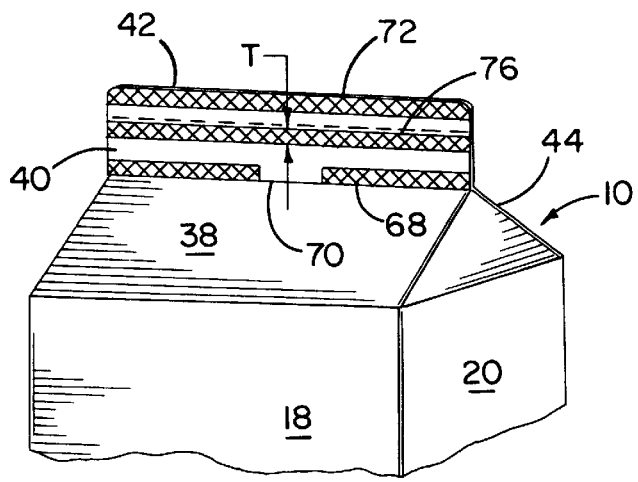
FIG. 6 is a fragmentary, perspective view of a closure portion on a container as in FIGS. 1–4 and showing one sealing arrangement between the fins on the container, according to the present invention.

In FIGS. 6 and 7, one sealing arrangement for the container 10 is shown. Initially, a seal is effected between the fins 40, 46, 52, 58 using a first sealing pattern as shown in FIG. 7. The first sealing pattern is produced over a first predetermined area as viewed from the exposed surface of the fin 40 in FIGS. 6 and 7. A first straight line portion 68 of the sealed area resides adjacent to a fold line 70 between the gable panel 38 and the fin 40. A second straight line portion 72 of the sealed area is at the top of the fin 40 adjacent to the free end 42 thereof. The portions 68, 72 are substantially parallel to each other and the fold line 70. With the fins 40, 46 having a greater vertical extension than the fins 52, 58, the seal at the portion 72 is effected directly between the fins 40, 46.

A second sealing pattern, as show in FIG. 6, is used to effect a seal between the fins 40, 46, 52, 58 over a second predetermined area. The second predetermined area, in this embodiment, includes a portion 76 in the form of a straight line that is parallel to, and mid-way between, the portions 68, 72.

In a preferred form, the sealing process is initiated using the first sealing pattern of FIG. 7. After a seal is effected using the first sealing pattern, a seal is effected using the second sealing pattern of FIG. 6.

The thickness T of the seal portions 68, 72, 76 is relatively small compared to the dimension T1 between the fold line 70 and the free end 42 of the fin 40. In the embodiment shown, the thickness T is on the order of ⅙th the dimension T1 and is preferably no more than ¼th the dimension T1, for reasons that will be explained below.

The seal portion 68 is effective in maintaining the closed relationship between the fins 40, 46, 52, 58 at the fold line 70. That is, the portion 68 resists springback of the closure portion at the location where the fins 40, 46 and gable panels 38, 44 meet. The seal portion 72 maintains the overlying relationship of the fins 40, 46, 52, 58 and seals the fin ends 42, 48, 54, 60 together to prevent expulsion of dust and other particulate material from therebetween.

With this arrangement, the integrity of the seal at the portion 76 may be consistently and positively effected. Because the fins 40, 46, 52, 58 are essentially stabilized in a closed state by the seal portions 68, 72, the seal portion 76 is not required to withstand any significant parting force between the fins 40, 46, 52, 58 attributable to the memory in the folded paperboard.

This arrangement allows different energy and/or temperature levels to be used for the different seal portions. For example, assuming an ultrasonic sealing technique is utilized, less energy can be used and/or a lower temperature developed in effecting the seal at the portions 68, 72, since it is not required that there be a hermetic seal thereat. Since the seal at the portions 68, 72 is produced at a lower temperature and/or energy level, stabilization/curing of the seal may occur more rapidly, as is desirable in mass filling operations. A higher temperature and/or energy level may be required only for the seal portion 76, which is required to be a hermetic seal to maintain an aseptic environment within the container 10.

By effecting the seal using a plurality of line portions 68, 72, 76 of relatively narrow thickness, there is relatively little heat retention within the seal in the fins 40, 46, 52, 58 and in the vicinity of the seal as a result of which fusion/curing occurs rapidly. By having the seal portions 68, 72, 74 fully spaced from each other, cooling is also enhanced. Cooling is still further enhanced by making the thicknesses T for the portions 68, 72, 76 relatively small. All of these factors contribute to rapid heat dissipation from the seal location which makes possible a shorter sealing time without compromising the integrity of the seal.

In FIGS. 8 and 9, alternative sealing patterns are shown to those in FIGS. 6 and 7. More particularly, a first sealing pattern is shown to be formed over a first predetermined area which is defined by line portions 80, 82, 84, 86, which cooperatively produce an overall "C" shape. The portion 80 is interrupted adjacent to the fold line 70, and is substantially parallel thereto, and to the portion 84, which is adjacent to the free end 42 of the fin 40. The line portions 82, 86 are generally parallel to each other and each connect between the portions 80, 84.

The second sealing pattern occupies an area that defines a straight line portion 88, which resides between and is parallel to the line portions 80, 84. The beneficial effect of the separate patterns is the same as previously described for the embodiment in FIGS. 6 and 7. It should be understood that other patterns are also contemplated by the invention.

Figure 5:
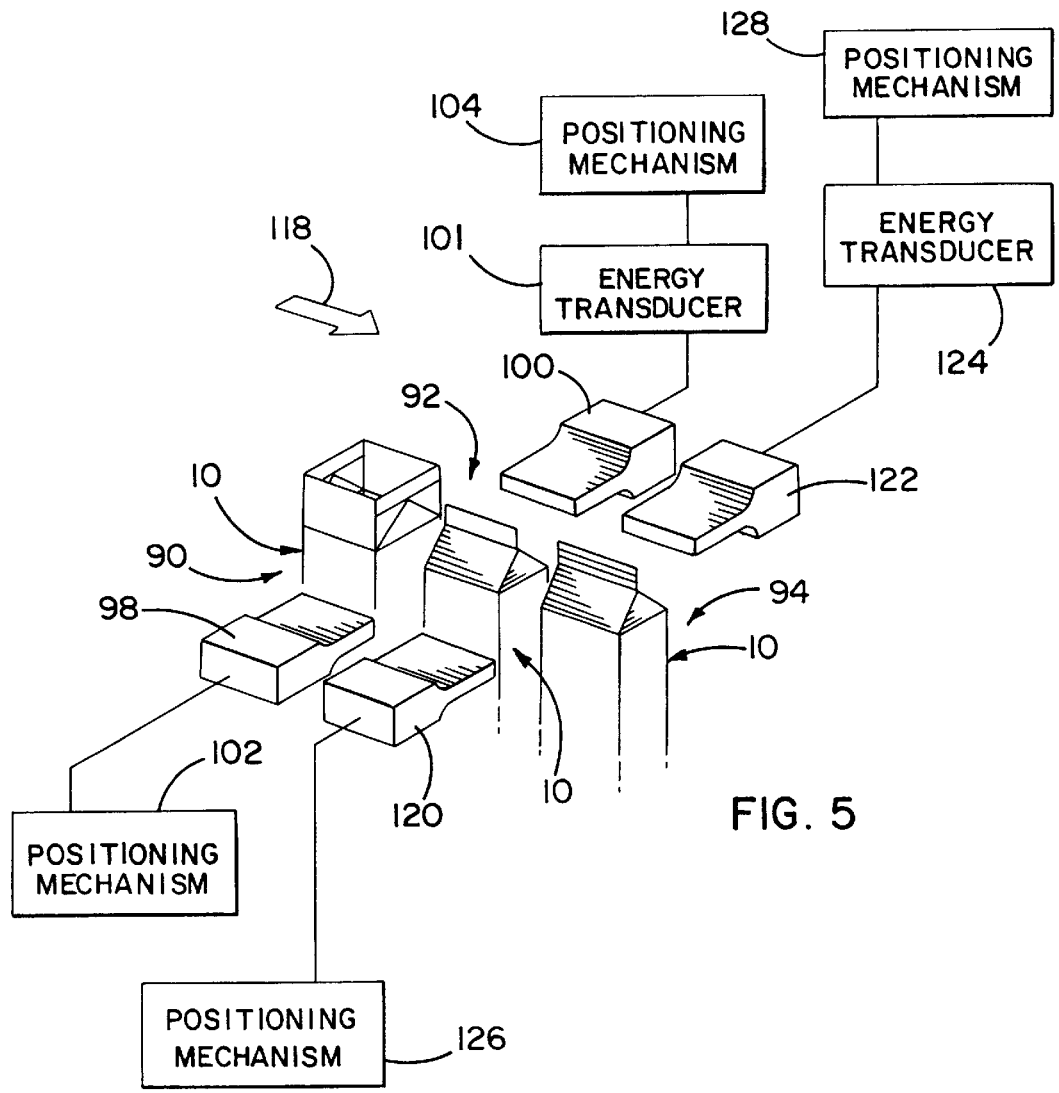
FIG. 5 is a perspective view of a line for filling containers and effecting a seal between fins thereon according to the present invention.

Various different methods may be used to form the sealing patterns shown in FIGS. 6–9. The sealing patterns could both be formed at a single station. While the sealing patterns could be formed at the same time, it is preferred that they be completed non-simultaneously. In the system shown in FIGS. 5 and 10, the containers 10 are serially moved from a filling station at 90 at which product is introduced to the container, to a first sealing station at 92 whereat sealing is effected using a first sealing pattern, and then to a second station 94, spaced from the first station 92, whereat sealing is effected using a second sealing pattern.

At the first sealing station 92, the container 10 is located between an anvil 98 and a sealing horn/sonotrode 100. The horn/sonotrode 100 includes a conventional energy transducer 101 and is operable as described in the above-mentioned patents in a manner well known to those skilled in the art. Positioning mechanisms 102, 104 allow the anvil 98 and horn/sonotrode 100 to be moved selectively towards and away from each other to selectively hold and release the container 10 in a sealing position at the station 92. However, one of the anvil 98 and horn/sonotrode 100 may remain stationary. With the anvil 98 and the horn/sonotrode 100 moved towards each other to the operative position of FIG. 10, the fins 40, 52, 46 become captive between a flat, holding surface 108 on an elongate projection 110 from the horn/sonotrode 100 and a facing holding surface 112 on the anvil 98. This captive engagement is established immediately above the gable panels 38, 44. The facing surfaces 108, 112 act as jaws that produce a compressive force on the container 10. The compressive force is maintained as the horn/sonotrode 100 is energized throughout a fall energizing pulse.

A second elongate projection 114 has a flat surface 116 to captively hold the fins 40, 48 against the anvil surface 112 adjacent to the free ends 42, 48 of the fins 40, 46. The holding force is exerted sufficiently close to the free ends 42, 48 so that there is substantially no spacing therebetween as might allow expulsion of foreign matter such as fibers, from the paperboard material to the surrounding environment as the container is vibrated. This minimizes the likelihood of contamination of the product placed within the container 10. The projection 114 extends to closer to the anvil surface 112 than the projection 110 since the surface 116 thereon captively holds in this particular embodiment only two layers whereas the surface 108 captively holds four layers of the paperboard.

After the ultrasonic sealing step is completed to form the sealing portions 68, 72, the anvil 98 and the horn/sonotrode 100 are retracted to allow the container 10 to be advanced in the direction of the arrow 118 to the station 94 whereat a second anvil 120 and horn/sonotrode 122 are located to cooperate in the same manner as the anvil 98 and the horn/sonotrode 100. The horn/sonotrode 122 has an energy transducer 124 which is energized to cause a seal to be effected at the location where the horn/sonotrode 122 contacts the container 10. In this case, the seal is effected using the second pattern to produce the seal portions 76. The anvil 120 and horn/sonotrode 122 are moved relative to each other through positioning mechanisms 126, 128 between a captive arrangement and a spaced arrangement, with the latter arrangement allowing the containers 120 to move between the anvil 120 and horn/sonotrode 122.

Figure 11:
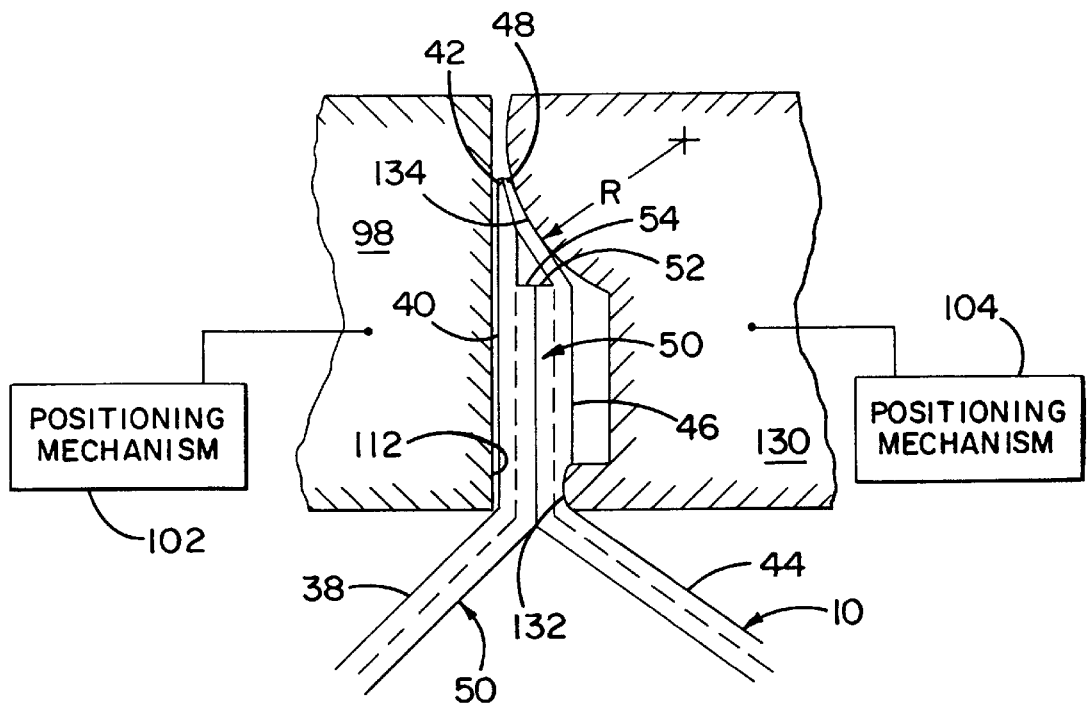
FIG. 11 is a view as in FIG. 10 and showing a modified form for the sealing members, according to the present invention.

In FIG. 11, a modified form of horn/sonotrode 130 is shown. The horn/sonotrode 130 has a surface 132 corresponding in shape and function to the surface 108 on the horn/sonotrode 100. However, in place of the projection 114, the horn/sonotrode 130 is provided with a curved surface 134 of radius R that results in a non-uniform spacing between the surfaces 112, 134 along the vertical extent of the surface 134. The surface 134 extends fully up to and beyond the free ends 42, 48 of the fins 40, 46. The curvature is chosen so that the free ends 42, 48 become pinched between the surface 134 and the anvil surface 112 while at the same time a progressively lesser compressive force is developed along a substantial length of the fins 40, 46 between the surfaces 112, 134 moving downwardly in FIG. 11 from the fin ends 42, 48. In this particular embodiment, approximately one half of the extensions of the fins 40, 46 beyond the free end 54 of the fin 52 are brought into contact with each other between the surfaces 134, 112. With this arrangement, the ends 42, 48 become squeezed together without exerting an excessive force elsewhere between the fins 40, 46. As the surfaces 134, 112 move into close proximity, a tight seal is made at the ends 42, 48 and the surface acts as a cover to block migration of foreign material from therebetween and to minimize the separation of fibers from the cut free ends 42, 48.

Figure 12:
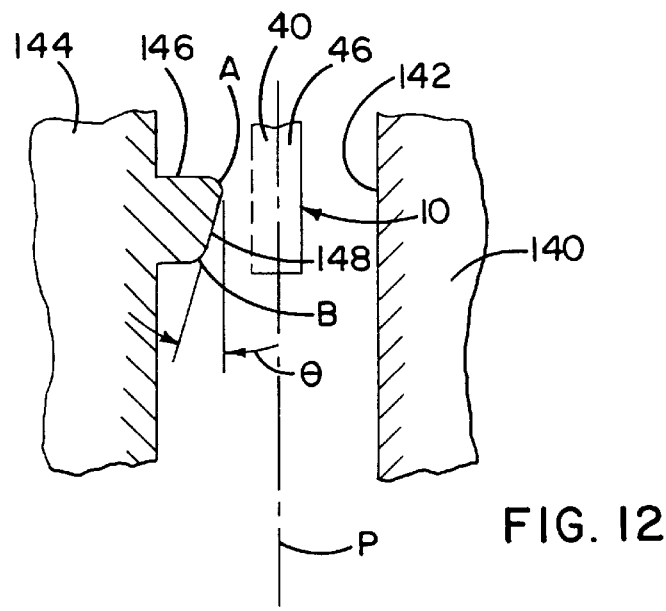
FIG. 12 is a view as in FIGS. 10 and 11 and showing a further modified form for the sealing members, according to the present invention.

A modified form of surface, corresponding to either of the surfaces 108, 116, is shown in FIG. 12. In FIG. 12, an anvil 140 is shown having a flat surface 142. A sealing horn/sonotrode 144 has a projection 146 with a flat surface 148 at the free end thereof. The anvil 140 and horn/sonotrode 144 are relatively movable to captively engage the container 10, as at the fins 40, 46, as previously described. In this embodiment, the surface 142 is parallel to a reference plane P. The surface 140 makes an angle θ with respect to the reference plane P that is preferably less than 10° and is more preferably on the order of 5°.

With conventional, parallel anvil and horn/sonotrode surfaces, the critical sealing pressure is ideally precisely controlled. Accordingly, the extent of the projection on which the surfaces are formed must be precisely controlled. With the arrangement in FIG. 12, the pressure at the location A is above critical while the pressure at location B is below critical. Between the locations A and B is a point which precisely produces the critical pressure. The flow of the sealing material can be advantageously directed by the angled surface 148 to reinforce the seal.

Figure 13:
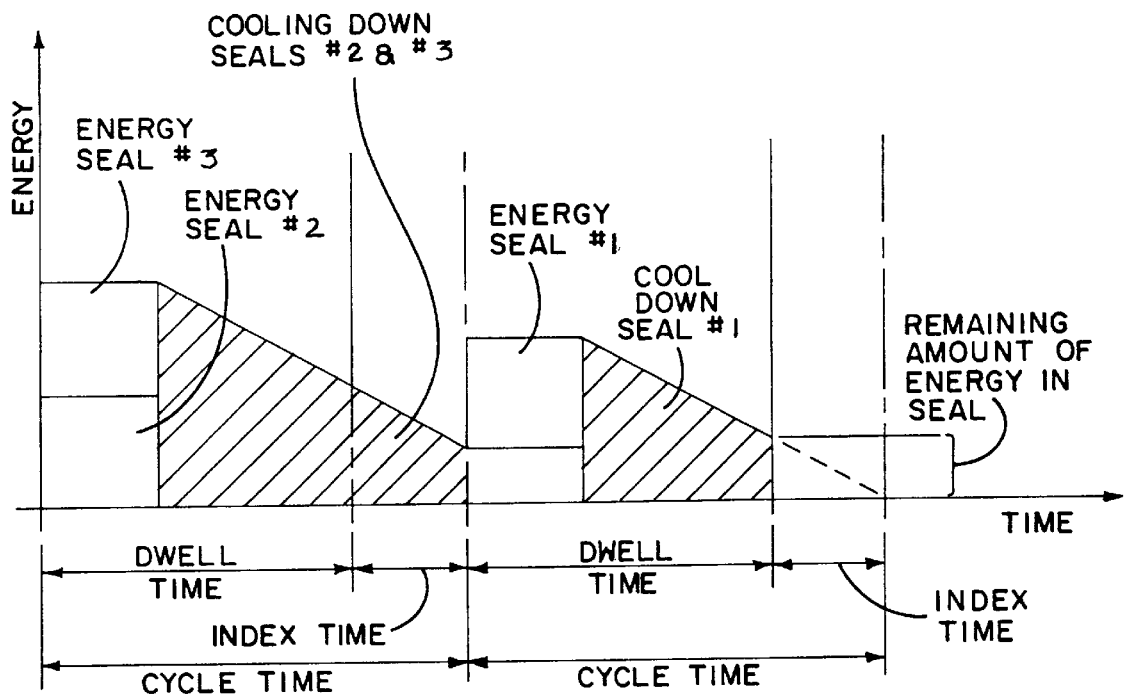
FIG. 13 is a graph showing energy retention using a two step sealing operation, according to the present invention, to effect the sealing arrangement in FIG. 6.
Figure 14:
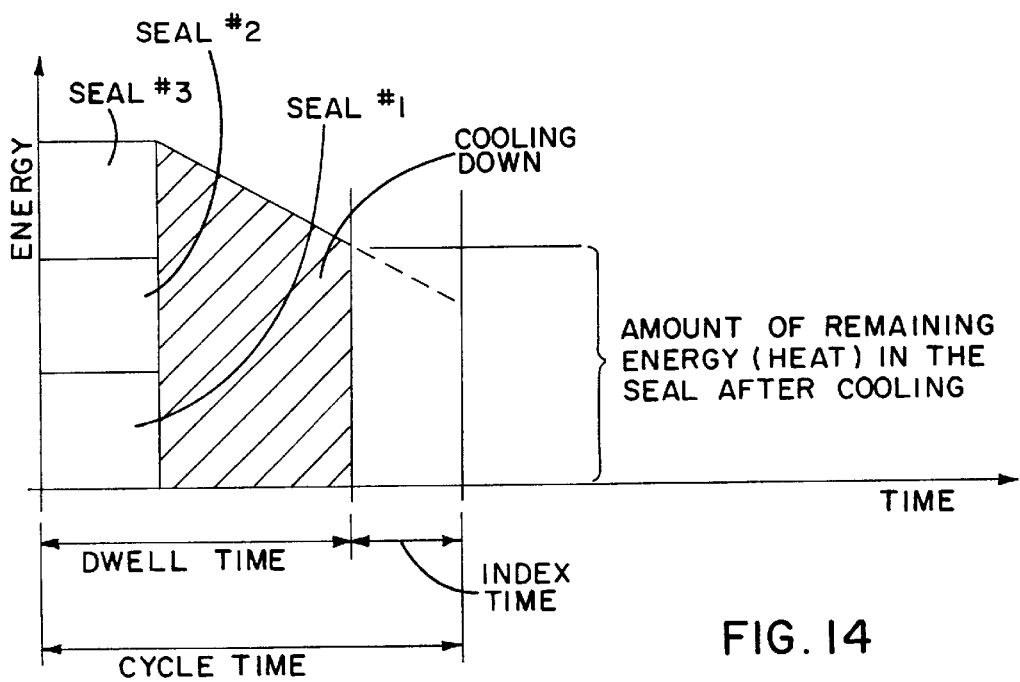
FIG. 14 is a graph as in FIG. 12 showing energy retention using a single step to effect the sealing arrangement in FIG. 6.

The advantage of the present invention can be demonstrated using energy graphs, as shown in FIGS. 13 and 14, where seal #1 corresponds to the line portion 76, seal #2 corresponds to the line portion 68, and seal #3 corresponds to the line portion 72. It can be seen that initially a greater amount of energy is required in the single step method in FIG. 14 to effect a seal by reason of the seal being made over a substantially greater area and by reason of the fact that a hermetic seal must be formed throughout. As a result, after the completion of a cycle, a relatively large amount of heat energy is retained by the container fins in and adjacent to the seal location. On the other hand, by using a two step/cycle arrangement as in FIG. 13, less energy input is required to initiate the separate sealing steps. As a result, less heat energy is retained by the container at and adjacent to the seal. By moving the containers 10 between sealing steps, additional cooling time is built into the process.

The low heat retention resulting from the practice of the present invention is attributable not only to the lower energy input required but also to the fact that the sealing lines are thin and fully spaced from each other such that heat can conduct readily to the adjacent, unsealed, and cooler portions of the fins.

The foregoing disclosure of specific embodiments is intended to be illustrative of the broad concepts comprehended by the invention.

We claim:

1. A method of forming a container, said method comprising the steps of:

providing a sheet material defining a peripheral wall structure bounding a receptacle with an open end and a closure portion comprising gable panels and a plurality of fins for closing the open end of the receptacle;

reconfiguring the closure portion to place the closure portion in a closed state wherein the plurality of fins are in overlying relationship and the gable panels reside between the fins and the peripheral wall structure;

effecting a seal between a plurality of the fins over a first predetermined area including a first substantially straight line portion and a second substantially straight line portion spaced from and substantially parallel to the first line portion; and after effecting the seal, effecting another seal between a plurality of the fins over a second predetermined area including a substantially straight line portion that is between and substantially parallel to each of the first and second line portions.

2. The method of forming a container according to claim 1 wherein the step of effecting another seal comprises the step of effecting a hermetic seal using an ultrasonic sealing technique.

3. The method of forming a container according to claim 1 wherein the step of effecting a seal comprises the step of effecting a non-hermetic seal and the step of effecting another seal comprises the step of effecting a hermetic seal.

4. A method of forming a container, said method comprising the steps of:

providing a sheet material defining a peripheral wall structure bounding a receptacle with an open end and a closure portion comprising gable panels and a plurality of fins for closing the open end of the receptacle;

reconfiguring the closure portion to place the closure portion in a closed state wherein the plurality of fins are in overlying relationship and the gable panels reside between the fins and the peripheral wall structure;

effecting a seal between a plurality of the fins using a first sealing pattern generated using an ultrasonic sealing technique at a first temperature and a first energy level; and after effecting the seal using the first sealing pattern, effecting another seal between a plurality of the fins using a second sealing pattern generated using an ultrasonic sealing technique at a second temperature and a second energy level with at least one of a) the first temperature being different than the second temperature and b) the first energy level being different that the second energy level.

\* \* \* \* \*